UNITED STATES PATENT OFFICE 2,225,441

DYESTUFFS OF THE PHTHALOCYANINE SERIES

Willy Braun and Karl Koeberle, Ludwigshafen-on-the-Rhine, Germany, assignors to General Aniline & Film Corporation, a corporation of Delaware No Drawing. Application June 1, 1939, Serial No. 276,807. In Germany January 19, 1937

3 Claims. (Cl. 260—314)

The present process relates to dyestuffs of the phthalocyanine series. This application is a continuation-in-part of our copending application Ser. No. 185,514, January 18, 1938.

We have found that valuable dyestuffs of the phthalocyanine series are obtained by heating ortho-dichloro compounds containing a trifluormethyl group with cuprous cyanide in the presence of an organic nitrogenous base. As starting materials there may be mentioned triflourmethyl derivatives of the benzene, naphthalene, anthracene, anthraquinone, pyrene, perylene and azaphenanthrene series. They may contain further substituents such as halogen atoms, hydroxyl, alkyl, aryl, amino and the like groups in addition to the two chlorine atoms in ortho-position necessary for the reaction.

Instead of starting from ready-made cuprous cyanide there may also be chosen starting materials which yield cuprous cyanide under the reaction conditions. For example, instead of using cuprous cyanide alone, a part thereof may be replaced by alkali metal cyanide and copper salts thus forming cuprous cyanide.

The reaction is carried out in the presence of at least one organic nitrogenous base which effects the dissolution of the cuprous cyanide in the reaction mixture. For this purpose, there may be mentioned in particular high boiling alkylamines, dialkylamines, hydroxyalkylamines, dihydroxyalkylamines, alkylarylamines and cyclic bases such as pyridines or quinolines. It is of special advantage to use these compounds together with finely divided copper or with copper salts, such as cuprous chloride or cuprous bromide. The course of the reaction is the more uniform the less of the cuprous cyanide used remains undissolved under the reaction conditions. In many cases it is also preferable to use diluents. The organic bases themselves may serve as diluents. There may also be used an excess of the ortho-dichloro compound, furthermore benzene and its derivatives, for example alkylbenzenes (xylenes, trimethylbenzenes), esters of benzoic acid, high-molecular alcohols, phenols, nitrobenzene, diphenyl, benzophenone, phenolethers, naphthalenes, alkylnaphthalenes and anthracene.

The initial materials, according to their nature and amount, may be so selected that working under pressure is unnecessary in most cases. The reaction may, however, also be carried out in a closed vessel. Sometimes, it is of advantage to drop slowly the ortho-dichloro compound as such or in the form of its solution at the reaction temperature to the mixture of cuprous cyanide and solvent. The reaction temperature depends on the starting materials and usually lies above 120° C., in many cases at from 150° to 250° C.

In most cases, the yields are very good and often almost the theoretical yields are obtained. Generally speaking the dyestuffs are obtained in a very pure state. They may be brought in the usual manner into the form most suited for their use. If necessary, they may be freed from impurities or separated from isomers in the usual manner. The copper salts remaining after the reaction may be reconverted directly into the cyanide serving as starting material after the dyestuff has been separated.

The dyestuffs may be used as pigments for most various purposes and also for dyeing a great variety of fibrous materials.

The following examples will further illustrate how the said invention may be carried out in practice but the invention is not restricted to these examples. The parts are by weight.

Example 1

A mixture of 800 parts of 3.4-dichlorbenzotrifluoride, 737 parts of cuprous cyanide, 590 parts of cuprous bromide and 1100 parts of quinoline is heated while stirring at 225° C. for about 6–8 hours and worked up in the usual manner. A reddish blue dyestuff is obtained which dissolves in strong sulphuric acid giving a green coloration.

Dyestuffs having similar properties are obtained by starting from 2.3-dichlorbenzotrifluoride or from 3.4-dichlor-1-trifluormethylmercaptobenzene of the formula

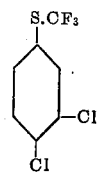

Example 2

1000 parts of 4.5-dichlor-1.3-bis-trifluormethylbenzene (obtainable from 5-amino-4-chlor-1.3-bis-trifluormethylbenzene by replacing the amino group by chlorine according to Sandmeyer) are allowed to drop slowly into a melt of 634 parts of cuprous cyanide, 1200 parts of quinoline and 500 parts of cuprous bromide at 230° C. while stirring. Then the mixture is heated at from 230 to 235° C. for from 6 to 8 hours. After cooling, the melt is triturated and purified with strong hydrochloric acid, water and methanol.

A dark green dyestuff is obtained which dissolves in strong sulphuric acid giving a green coloration. By pouring the solution onto ice the dyestuff precipitates in the form of blue-green flakes.

What we claim is:

1. A copper phthalocyanine containing, in symmetrical positions of each of the four benzene nuclei of the phthalocyanine molecule, up to two trifluormethyl groups, dissolving in concentrated sulphuric acid giving a green coloration, being insoluble in organic solvents, forming violet-blue crystals.

2. A copper phthalocyanine containing, in symmetrical positions of each of the four benzene nuclei of the phthalocyanine molecule, two trifluormethyl groups, dissolving in concentrated sulphuric acid giving a green coloration, being insoluble in organic solvents, forming violet-blue crystals.

3. 4.4'.4''.4'''- tetra(trifluormethyl) - copper phthalocyanine dissolving in concentrated sulphuric acid giving a green solution, being insoluble in organic solvents, forming violet-blue crystals.

WILLY BRAUN.
KARL KOEBERLE.